(12) United States Patent
Lin

(10) Patent No.: US 7,732,961 B2
(45) Date of Patent: Jun. 8, 2010

(54) COMBINED GENERATOR WITH BUILT-IN EDDY-CURRENT MAGNETIC RESISTANCE

(76) Inventor: Lily Lin, No. 278, Sijhou Road, Yuanshan Township, YiLan County 264 (TW)

( * ) Notice: Subject to any disclaimer, the term of this patent is extended or adjusted under 35 U.S.C. 154(b) by 326 days.

(21) Appl. No.: 12/007,180

(22) Filed: Jan. 8, 2008

(65) Prior Publication Data

US 2009/0174271 A1    Jul. 9, 2009

(51) Int. Cl.
   *H02K 21/22*        (2006.01)
(52) U.S. Cl. .................................. 310/153; 310/74
(58) Field of Classification Search .............. 310/74, 310/153, 89–90
   See application file for complete search history.

(56) References Cited

U.S. PATENT DOCUMENTS

| | | | | |
|---|---|---|---|---|
| 3,828,212 | A * | 8/1974 | Harkness et al. | 310/153 |
| 4,095,922 | A * | 6/1978 | Farr | 417/313 |
| 5,998,902 | A * | 12/1999 | Sleder et al. | 310/153 |
| 7,012,349 | B1 * | 3/2006 | Walker | 310/156.19 |
| 7,018,324 | B1 * | 3/2006 | Lin | 482/63 |
| 7,362,018 | B1 * | 4/2008 | Kulogo et al. | 310/68 B |
| 7,531,931 | B2 * | 5/2009 | Hashiba et al. | 310/153 |
| 7,586,226 | B2 * | 9/2009 | Kihara | 310/74 |
| 2007/0188031 | A1 * | 8/2007 | Shu et al. | 310/74 |

* cited by examiner

*Primary Examiner*—Thanh Lam
(74) *Attorney, Agent, or Firm*—Rosenberg, Klein & Lee

(57) ABSTRACT

A combined generator with built-in eddy-current magnetic resistance including a rotor and a stator iron core with generating coils winding therearound. The rotor consists of an outward turning type inertia flywheel and permanent magnets. A self-generated supply is achieved when the flywheel is driven by a fitness apparatus or a rehabilitation apparatus. An internal ring (A magnet-conductive ring) between the wheel hub and the external ring of the flywheel is extended from the internal wall toward the opening end. The internal diameter of the stator iron core is greater than the external diameter of the magnet-conductive ring such that a magnetic field gap is created. At least one receiving portion is formed in at least one portion of the internal circumference of the stator iron core for receiving at least one solenoid. The power required by the solenoid is supplied by the self-generated system such that the solenoid produces a magnetic field (by input of the power), thereby providing the magnet-conductive ring coupled to and rotated on the inertia flywheel with an eddy-current magnetic resistance. In this way, a reverse resistance acts from the inside on the inertia flywheel such that a braking effect is achieved.

7 Claims, 12 Drawing Sheets

COMBINED GENERATOR WITH BUILT-IN EDDY-CURRENT MAGNETIC RESISTANCE

BACKGROUND OF THE INVENTION

1. Field of the Invention

The invention relates to a combined generator with built-in eddy-current magnetic resistance, and more particularly to a generator that employs an outward turning type inertia flywheel to form a self-generated supply system. Meanwhile, one or several solenoids for producing the eddy-current magnetic resistance are integrally formed on the internal circumference of the stator iron core.

2. Description of the Related Art

The direct application of the automotive generator to the fitness apparatus and the rehabilitation apparatus that serves as a resistance system is traced back to the American fitness apparatus at the early stage. The American automotive industry is well developed. Meanwhile, the generator employed in the fitness apparatus was not popular. Therefore, no generator specially designed for the fitness apparatus is available. Due to the easy access and the mature technique, most of the fitness apparatus assembly manufacturers employed the automotive generator to be power supply and resistance source of the fitness apparatus. However, the automotive generator is not designed specially for the fitness apparatus. As a result, there are many parts that do not comply with the features of the fitness apparatus. This will be described as follows:

Generally, the automotive engine requires a higher rotational speed. Therefore, the problem of efficiency of the low rotational speed is often neglected when the automotive generator is developed. To the contrary, the fitness apparatus and the rehabilitation apparatus just require the low rotational speed. In order to obtain a higher efficiency under the low rotational speed, the fitness apparatus manufacturers tried to enhance the rotational speed for fulfilling the requirement of high rotational speed of the automotive generator. The rise of the rotational speed of the generator results in the increase of the efficiency. However, other problems appear:

1. In order to achieve the rise of the rotational speed, the one-stage transmission has to be changed in a two-stage transmission, thereby increasing the manufacturing difficulty and cost.
2. The high rotational speed causes a greater resonance and magnetic sound. It is much unfavorable for the people to use the fitness apparatus and the rehabilitation apparatus indoors since they normally do not like noise to disturb their mood.
3. Unlike the fitness apparatus, the automotive generator does not require the application of inertia. Therefore, no inertia flywheel is installed in the automotive generator. However, the automotive generator employed in the fitness apparatus brings the operator an uncomfortable feeling in using the apparatus.
4. The automotive generator has a greater length so that the vehicle body of the fitness apparatus and the rehabilitation apparatus is correspondingly wider. Therefore, the feet of the operator have to be opened to a greater extent, thereby causing discomfort in use.

As shown in FIGS. 1A and 1B, the generator used as resistance system of fitness apparatus includes a shaft 11 passing through an inertia flywheel 12 and a magnet core 14. A plurality of generating coils 15 is disposed on the circumference of the magnet core 14. A generator 10 is formed when the inertia flywheel 12 and the permanent magnets 13 on the internal side thereof are rotated. Such a structure is disclosed in U.S. Pat. Nos. 4,775,145, 5,558,624, 5,236,069, etc. In comparison with the automotive generator, it is more suitable for the application to the fitness apparatus and the rehabilitation apparatus. Advantages thereof are described as follows:

1. The form is flat and suitable for the fitness apparatus and the rehabilitation apparatus. Meanwhile, the vehicle body can be designed in a flat form so that it is not necessary for the operator to open his feet greatly. As a result, a comfortable feeling in taking exercise can be obtained.
2. The structure is designed specially for the fitness apparatus. Therefore, an inertia flywheel is available for providing sufficient inertia that ensures a smooth movement.

However, it still has the following inevitable drawbacks:

1. The resistance source is mainly resulted from the reverse connection of the power source of the generator. When the resistance is required, the type of the original generator is converted into the type of an electric motor, thereby creating a force opposite to the movement direction for achieving a braking effect. However, this braking effect is not enough. In order to eliminate this drawback, the speed ratio has to be enlarged by increasing the rotational speed of the generator. Nevertheless, the increase of the speed ratio will create the drawbacks as depicted in points 1 and 2 of the automotive generator.
2. The vibration and the noise created by multiple resonance of the reverse connection of power depicted in point 1 will be more intensified.
3. The power of the generator is not always effectively utilized. In other words, one part of the power must be consumed and lost. Therefore, a great resistance has to be installed for consuming the redundant power, thereby increasing the cost and lowering the efficiency.

Another composite generator includes a solenoid 16 and a magnet core 17. The structure is illustrated in FIGS. 2A and 2B and disclosed in U.S. Pat. No. 6,084,325. This structure employs the redundant power of the generator to create the braking force as the resistance for the fitness apparatus and the rehabilitation apparatus. In this way, the drawbacks of the above-mentioned two products can be effectively removed. In other words, this structure successfully changes two-stage transmission of the fitness apparatus and the rehabilitation apparatus of the generator into one-stage transmission, thereby considerably reducing the production cost and lowering the demand on the vehicle body. The advantages and the disadvantages are shown as follows:

Advantages:

1. The efficiency is effectively increased such that the two-stage transmission of the fitness apparatus and the rehabilitation apparatus is changed into one-stage transmission, thereby ensuring a great reduction of cost.
2. The demand on the precision of the vehicle body is decreased due to the one-stage transmission, thereby reducing the failure rate of the whole vehicle.
3. The rotational speed of the generator is low due to the one-stage transmission, thereby effectively minimizing the resonance and the noise.
4. The flat structure is favorable for the design of the vehicle body and suitable for the fitness apparatus and the rehabilitation apparatus. In other word, the vehicle body can be made flatter. Meanwhile, it is not necessary for the operator to open his feet widely, thereby ensuring a comfortable exercise.

Disadvantages:

1. The fixed structure: A higher performance is only available when a uniform gap between the solenoid 16 (as well as the magnet core 17) and the inertia flywheel 12. Due to the fixed structure, the dimensions of the generator are not changeable according to the demand of each operator.

2. The magnet core 14 and the magnet core 17 of the generator are two separate and independent systems so that the production cost is higher.

3. The solenoid 16 is a separate body installed outside the inertia flywheel 12 so that the volume thereof is greater. This is unfavorable for the design of the whole vehicle body.

The above-mentioned systems have their own advantages and disadvantages. Therefore, we keep the advantages of all systems and improve the disadvantages. It is expected to resolve the above-mentioned problems.

SUMMARY OF THE INVENTION

An object of the invention is to provide a combined generator with built-in eddy-current magnetic resistance in which the solenoids are disposed within the flywheel unlike the conventional one positioned outside the flywheel. As a result, the outer diameter of the flywheel can be changed at will such that the intensity of the inertia of the flywheel varies. Meanwhile, the braking force won't be affected. Moreover, the number of solenoid is also variable according to different requirements.

Another object of the invention is to provide a combined generator with built-in eddy-current magnetic resistance in which the iron core of the current-generating coils and the solenoids are integrally formed. Therefore, the demand on the material for the iron core is effectively reduced. Moreover, the volume of the generator can be minimized due to the built-in configuration of the solenoid, thereby ensuring a flexible production of the fitness apparatus and the rehabilitation apparatus.

In order to achieve the above-mentioned object, a combined generator with built-in eddy-current magnetic resistance includes a rotor and a stator iron core with generating coils winding therearound. The rotor consists of an outward turning type inertia flywheel and permanent magnets. A self-generated supply is achieved when the flywheel is driven by a fitness apparatus or a rehabilitation apparatus. An internal ring between the wheel hub and the external ring of the flywheel is extended from the internal wall toward the opening end. A magnet-conductive ring is mounted on the external circumference of the internal ring. The internal diameter of the stator iron core is greater than the external diameter of the magnet-conductive ring such that a magnetic field gap is created. At least one double recessed type (⊔-shaped) receiving portion is formed in at least one portion of the internal circumference of the stator iron core for receiving at least one solenoid. The power required by the solenoid is supplied by the self-generated system such that the solenoid produces a magnetic field (by input of the power), thereby providing the magnet-conductive ring coupled to and rotated on the inertia flywheel with an eddy-current magnetic resistance. In this way, a reverse resistance acts from the inside on the inertia flywheel such that a braking effect is achieved.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

Figure 1B:
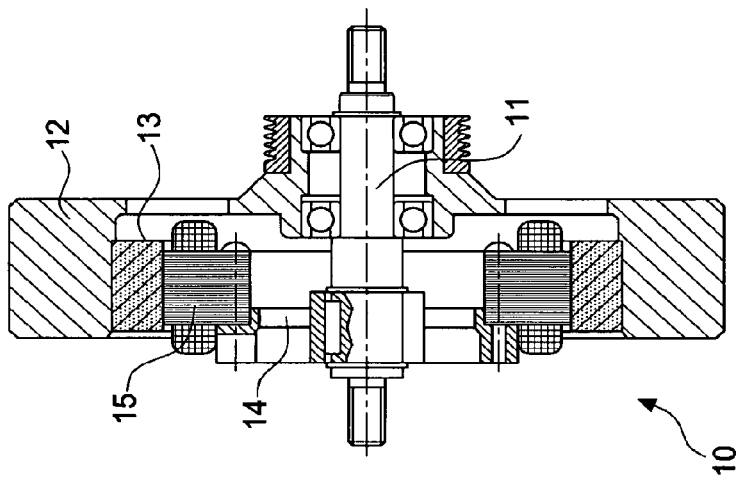
FIGS. 1A and 1B are schematic drawings of a conventional structure only for generating current.
Figure 1A:
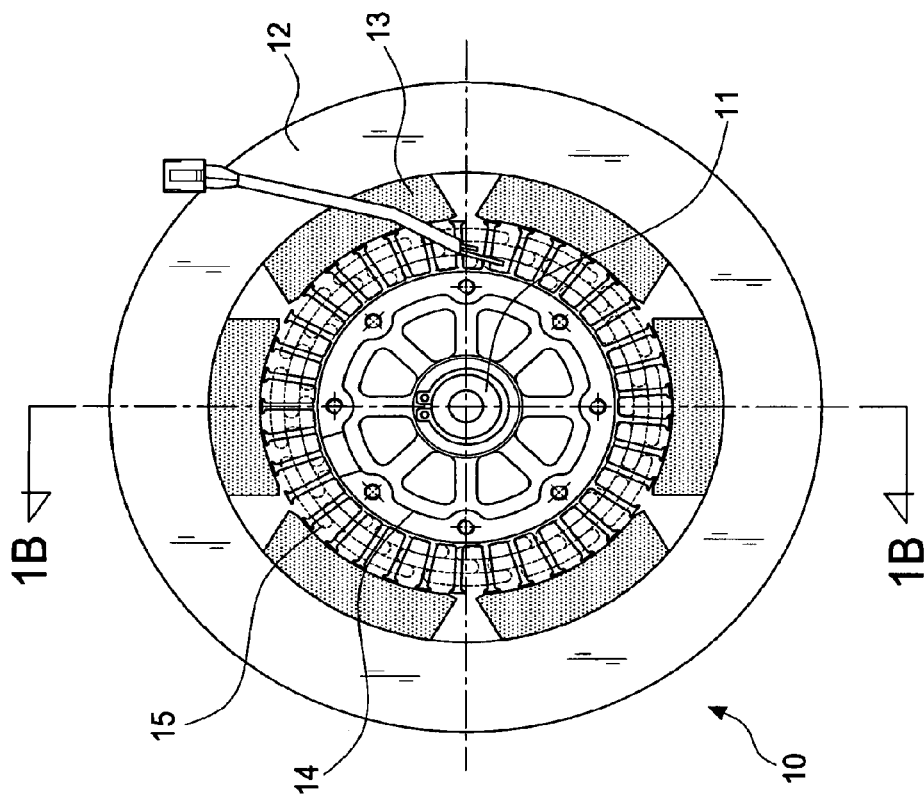
Figure 2B:
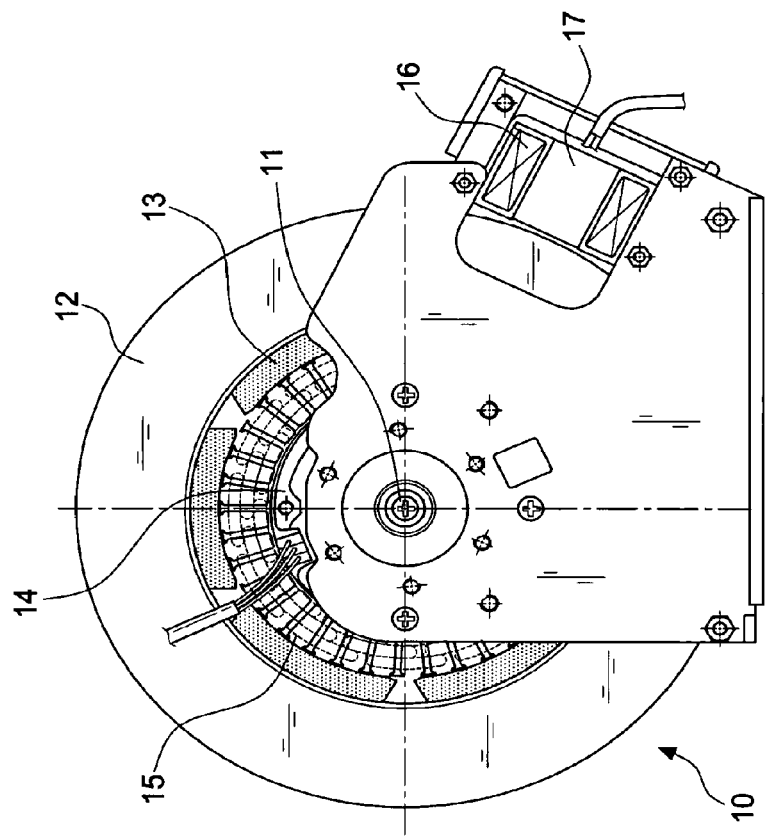
FIGS. 2A and 2B are schematic drawings of a conventional combined structure.
Figure 2A:
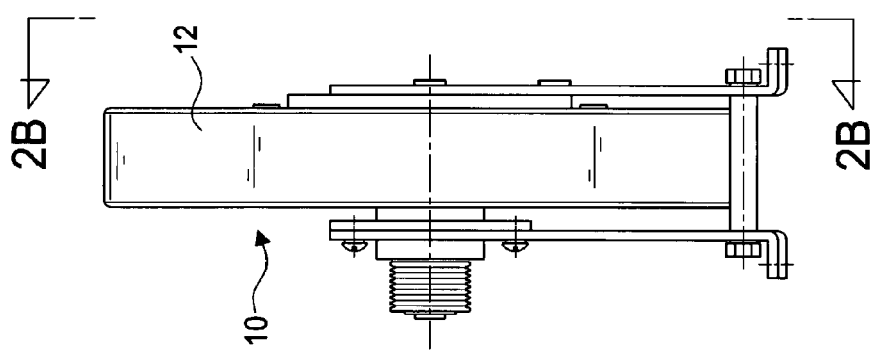
Figure 3:
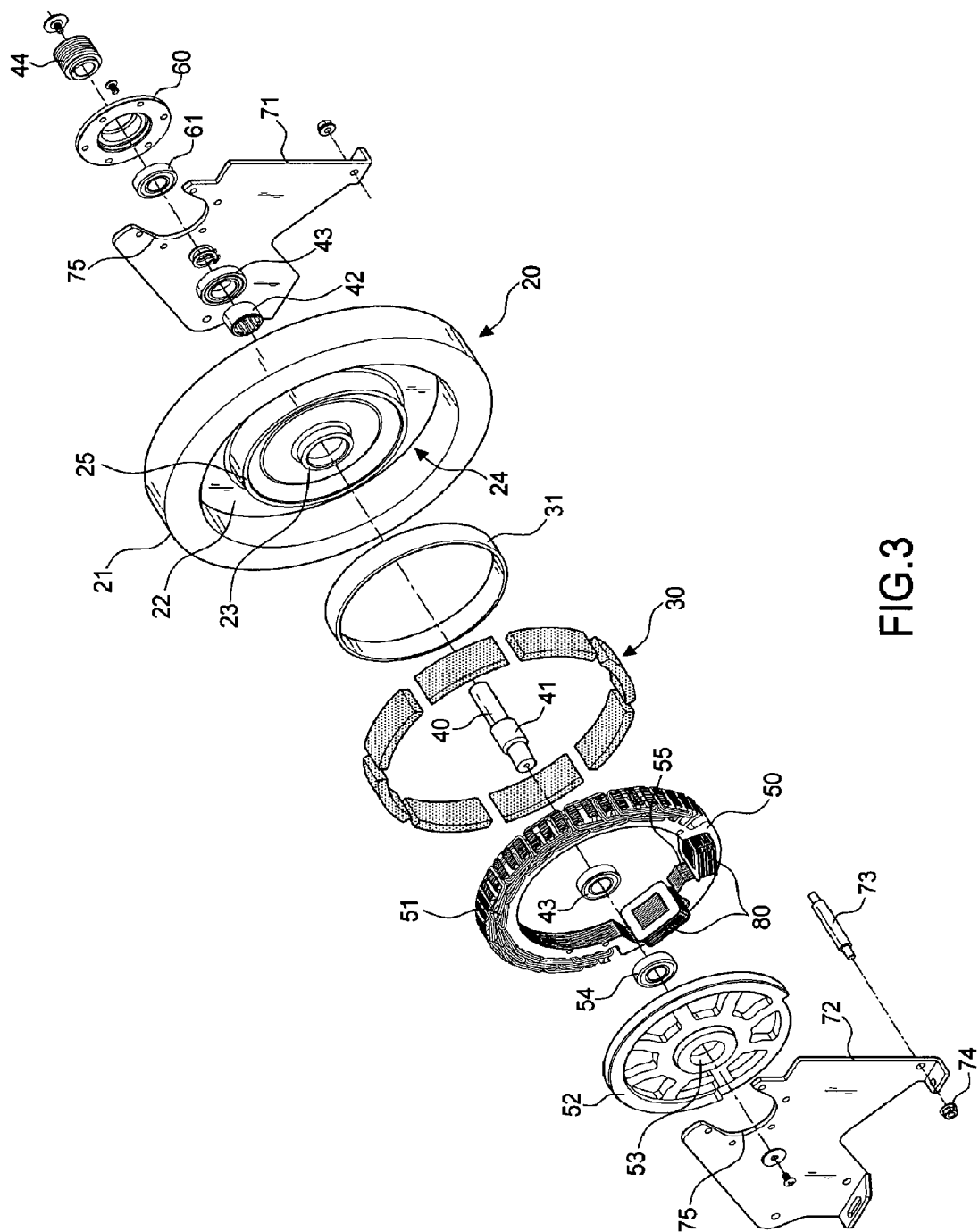
FIG. 3 is an exploded perspective view of a first embodiment of the invention.
Figure 3A:
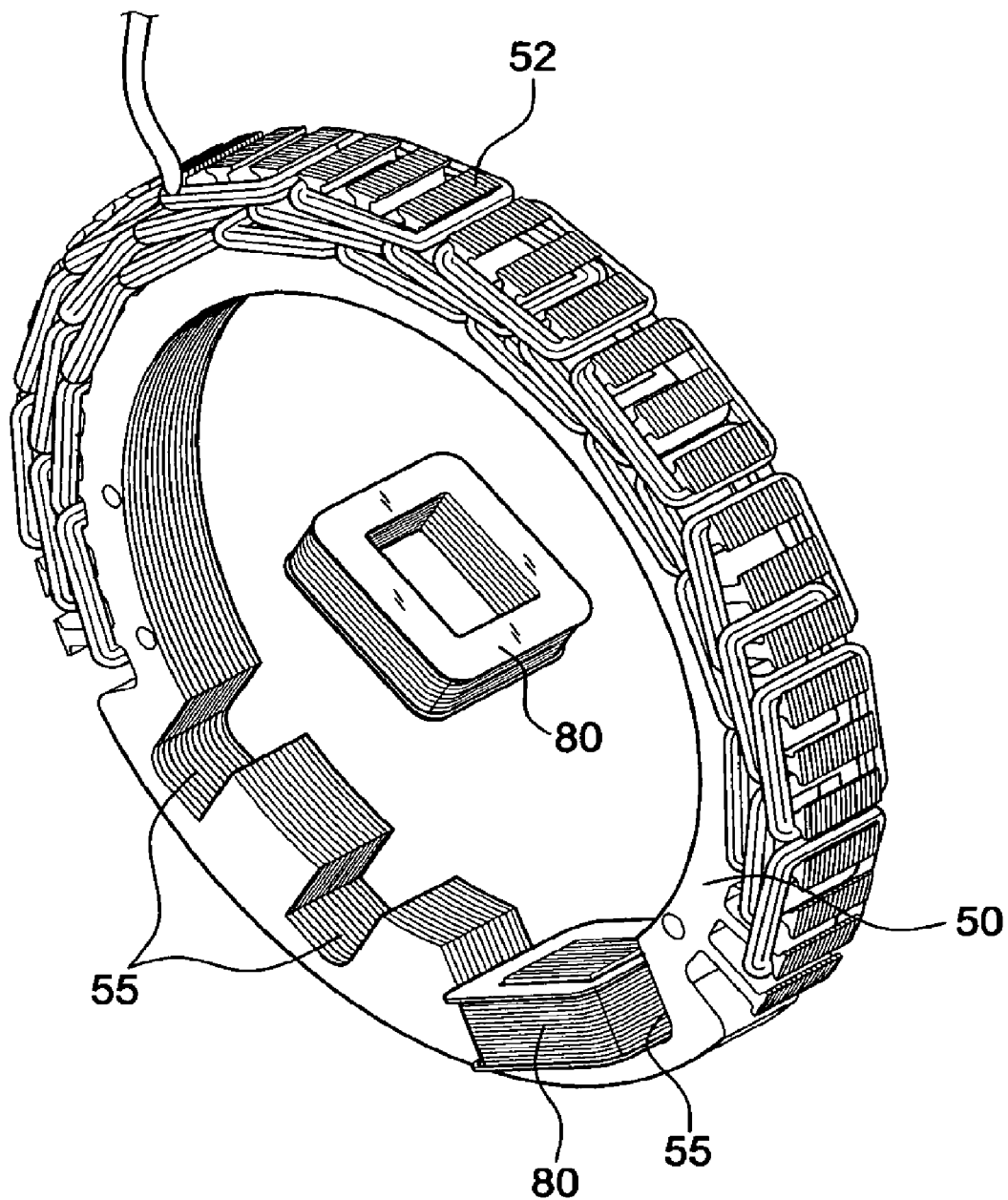
FIG. 3A is an enlarged view of the primary structure of FIG. 3.
Figure 4:
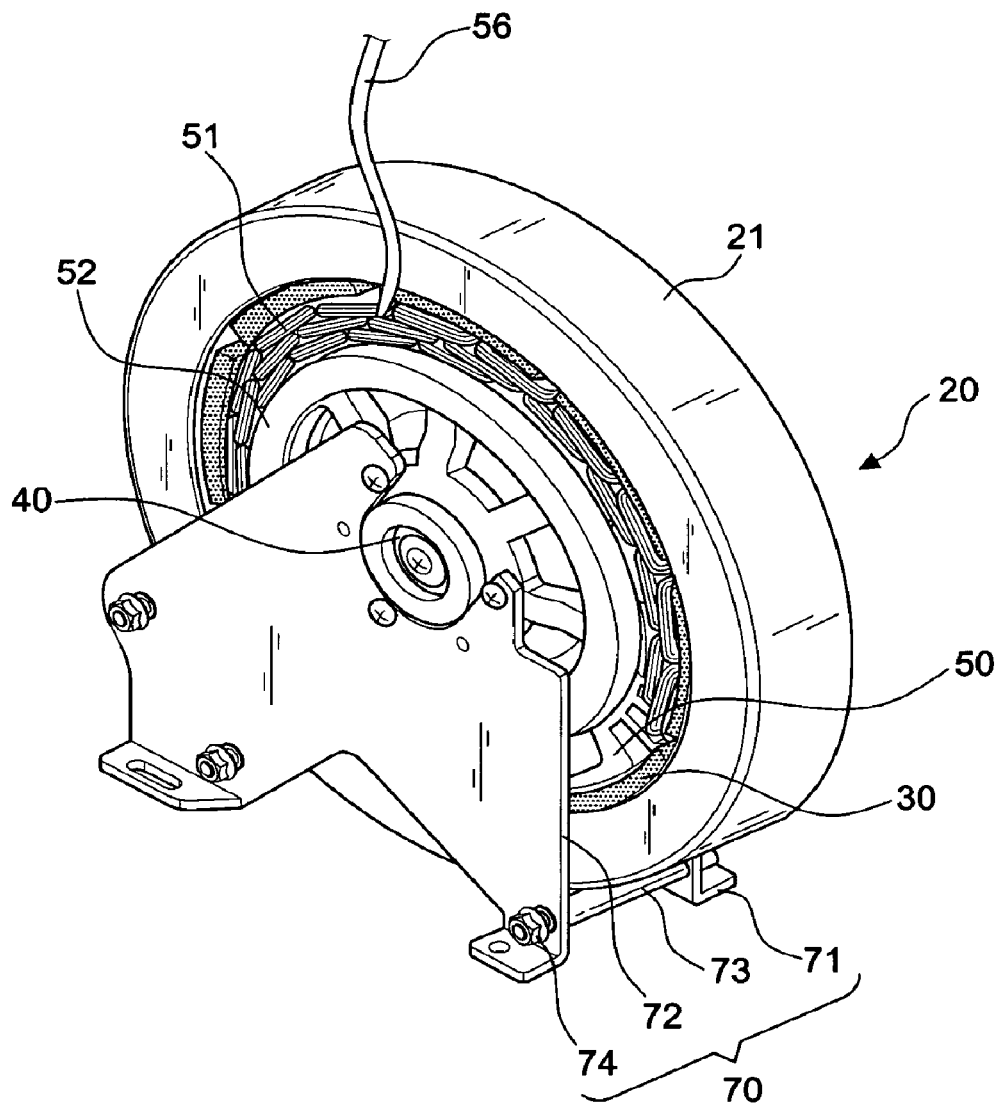
FIG. 4 is a perspective view of the first embodiment of the invention.

First of all, referring to FIGS. 3 through 6, a first embodiment of the invention includes an outward turning type inertia flywheel 20, a plurality of permanent magnets 30, a rotational shaft 40, a stator iron core 50, a sleeve 60, and a support bracket 70.

The outward turning type inertia flywheel 20 includes an external ring 21 and an internal wall 22. A wheel hub 23 is formed in the middle of the internal wall 22. Meanwhile, the outward turning type inertia flywheel 20 includes an opening end 24 at the external side thereof.

The permanent magnets 30 are disposed at the internal side of the external ring 21, thereby forming a rotor.

The rotational shaft 40 includes a bearing unit mounting thereon for supporting the flywheel 20. One end thereof is provided with a driven wheel 44 for imparting the rotational movement to the rotational shaft 40 and the flywheel 20. According to the embodiment, the bearing unit includes a unidirectional bearing 42 mounted on a middle section 41 of the rotational shaft 40 having a greater diameter and two ball bearings 43 mounted on a section adjacent to both sides of the middle section 41.

The stator iron core 50 includes current-generating coils 51 on an external circumference thereof. Moreover, an iron core-fixing support 52 is attached to the external side thereof. An external bearing 54 is disposed between a central hole 53 of the iron core-fixing support 52 and the rotational shaft 40.

The sleeve 60 is disposed at a side opposing to the iron core-fixing support 52. An internal bearing 61 is interposed between the internal circumference of the sleeve 60 and the rotational shaft 40.

The support bracket 70 consists of an internal support plate 71 and an external support plate 72 both of which are connected by use of the bolts 73 and nuts 74. An indentation 75 is formed at the top of the support plates 71, 72 for receiving the sleeve 60 and the iron core-fixing support 52 in place.

Based upon the above-mentioned configuration, a self-generated supply is achieved when the flywheel 20 is driven to rotate around the stator iron core 50. The above-mentioned configuration belongs to the prior art and is not the object of the invention so that details and functions thereof are not described hereinafter.

The invention is characterized in that an internal ring 25 between the wheel hub 23 and the external ring 21 of the flywheel 20 is extended from the internal wall 22 toward the opening end 24. Meanwhile, a magnet-conductive ring 31 is mounted on the external circumference of the internal ring 25. Moreover, the internal diameter of the stator iron core 50 is greater than the external diameter of the magnet-conductive ring 31 such that a magnetic field gap is created. In addition, at least one double recessed type (ய-shaped) receiving portion 55 is formed in at least one portion of the internal circumference of the stator iron core 50 for receiving one or several solenoids 80. The power required by the solenoids 80 is supplied by the self-generated system, thereby imparting an eddy-current magnetic resistance to the internal ring 25 when coupled and rotated. In this way, the inside acts a reverse resistance on the flywheel 20. According to this embodiment, the receiving portion 55 in the internal circumference of the stator iron core 50 includes two double recessed (ய-shaped) portions for receiving two solenoids 80. It should not be restricted thereto. In other words, one or several solenoids 80 can be provided according to the requirement of the generator.

Figure 5:
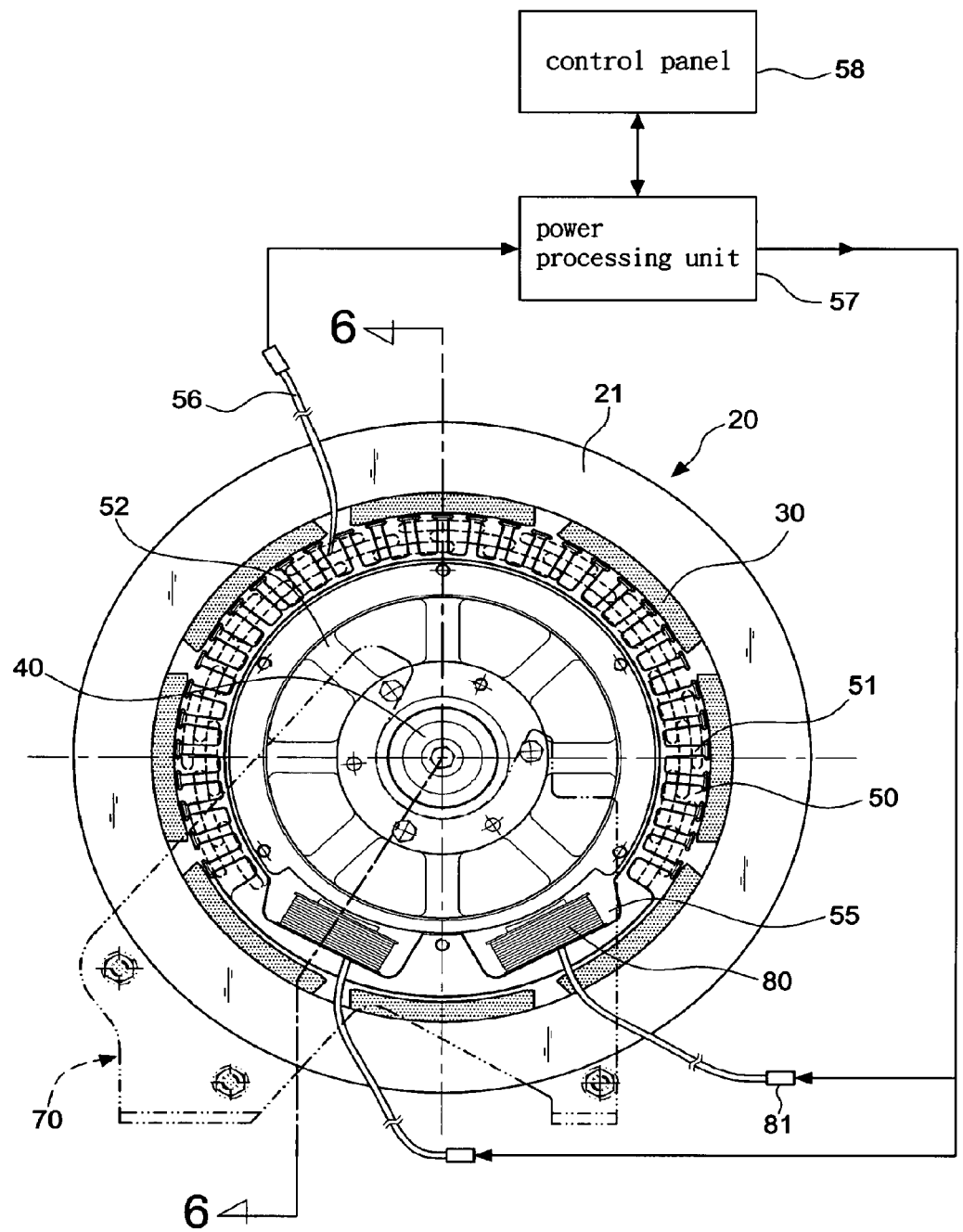
FIG. 5 is a front view of the first embodiment of the invention.
Figure 6:
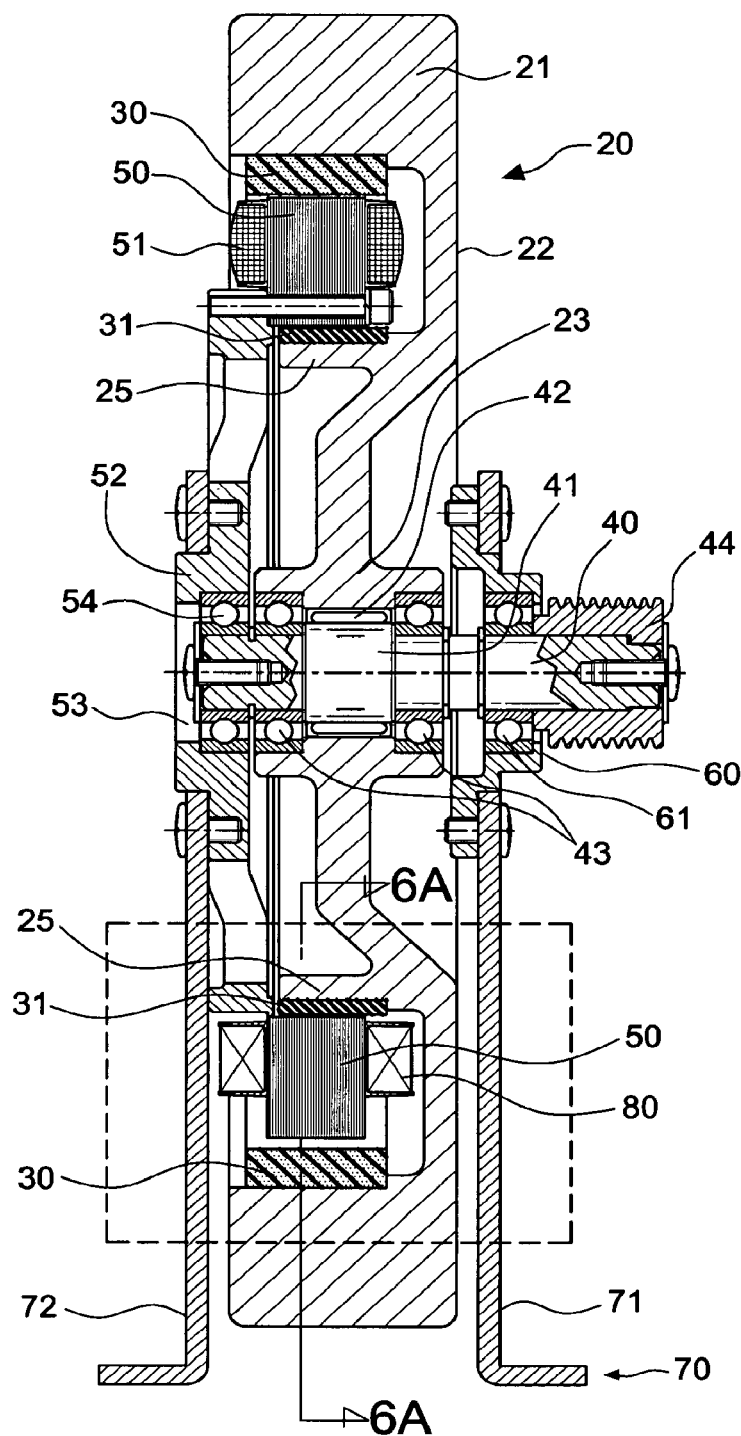
FIG. 6 is a cutaway view taken along line 6-6 of FIG. 5.
Figure 6A:
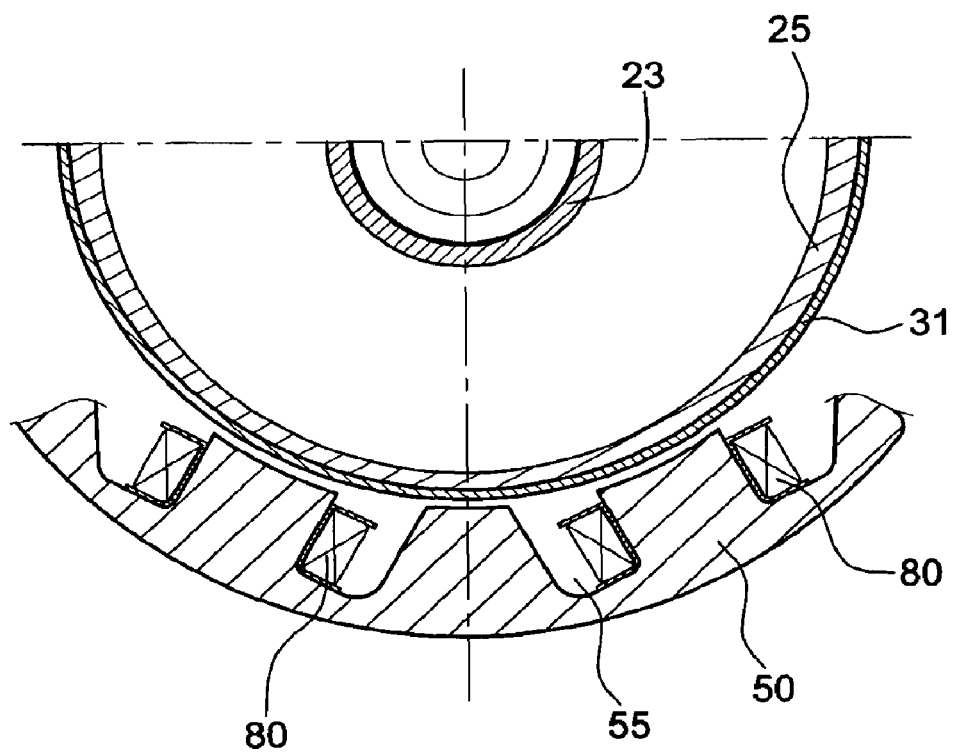
FIG. 6A is a cutaway view taken along line 6A-6A of FIG. 6.
Figure 7:
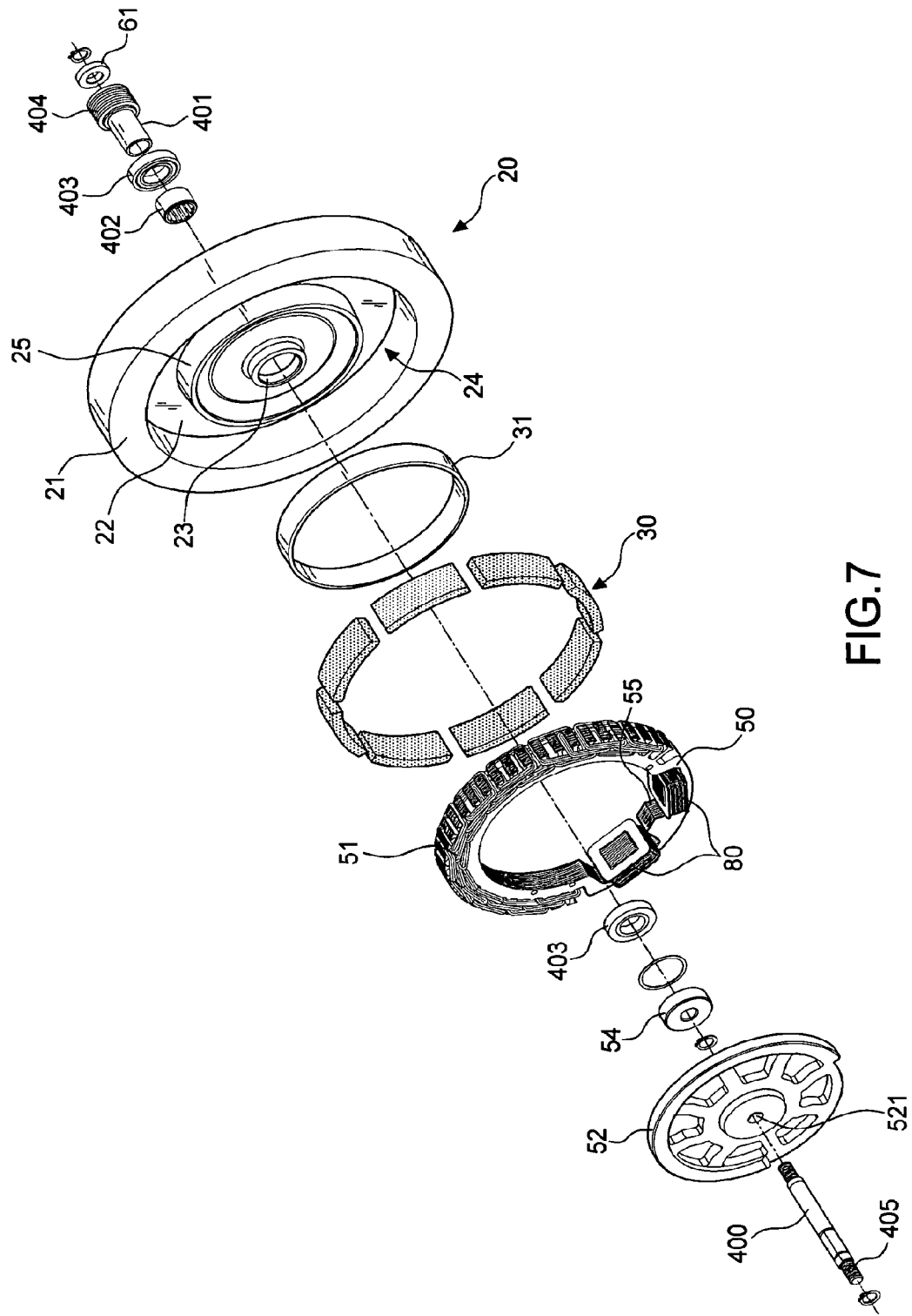
FIG. 7 is an exploded perspective view of a second embodiment of the invention.
Figure 8:
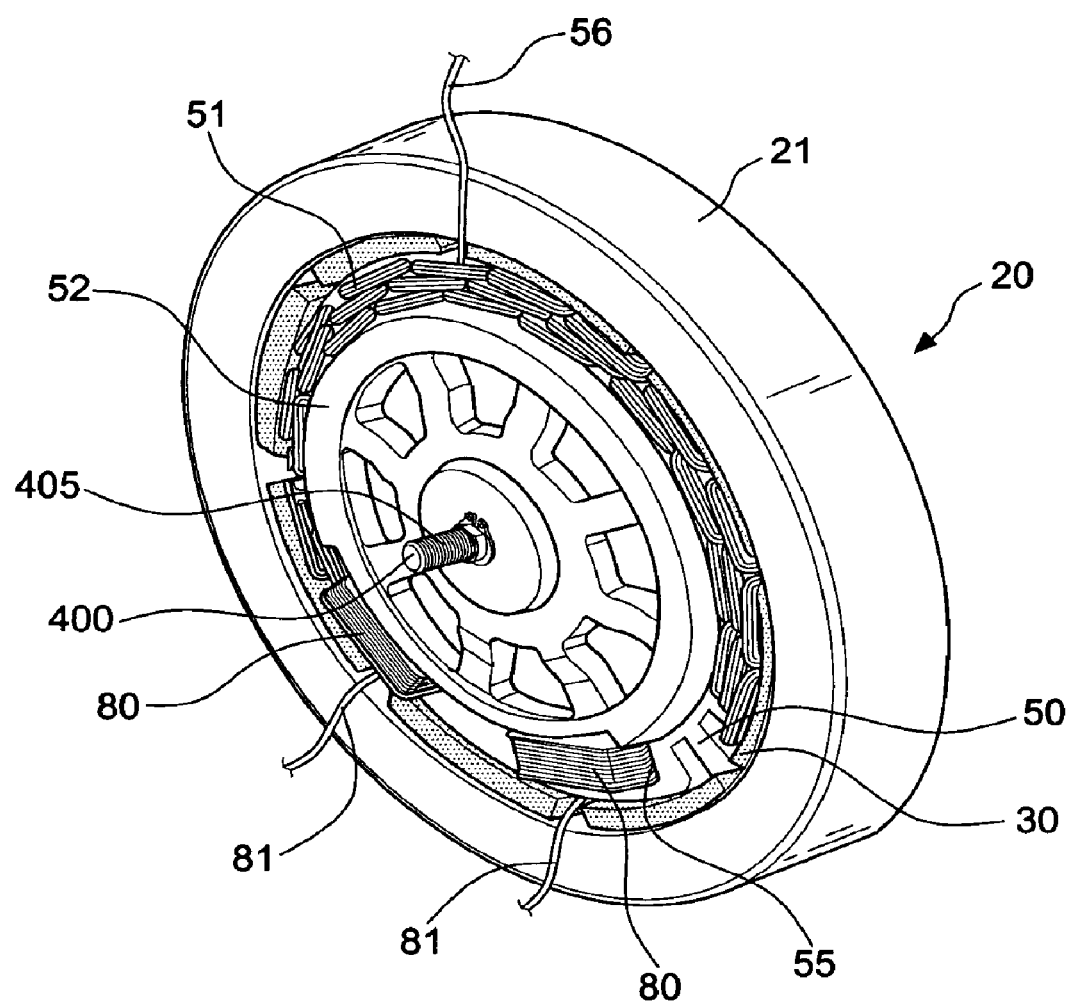
FIG. 8 is a perspective view of the second embodiment of the invention.
Figure 9:
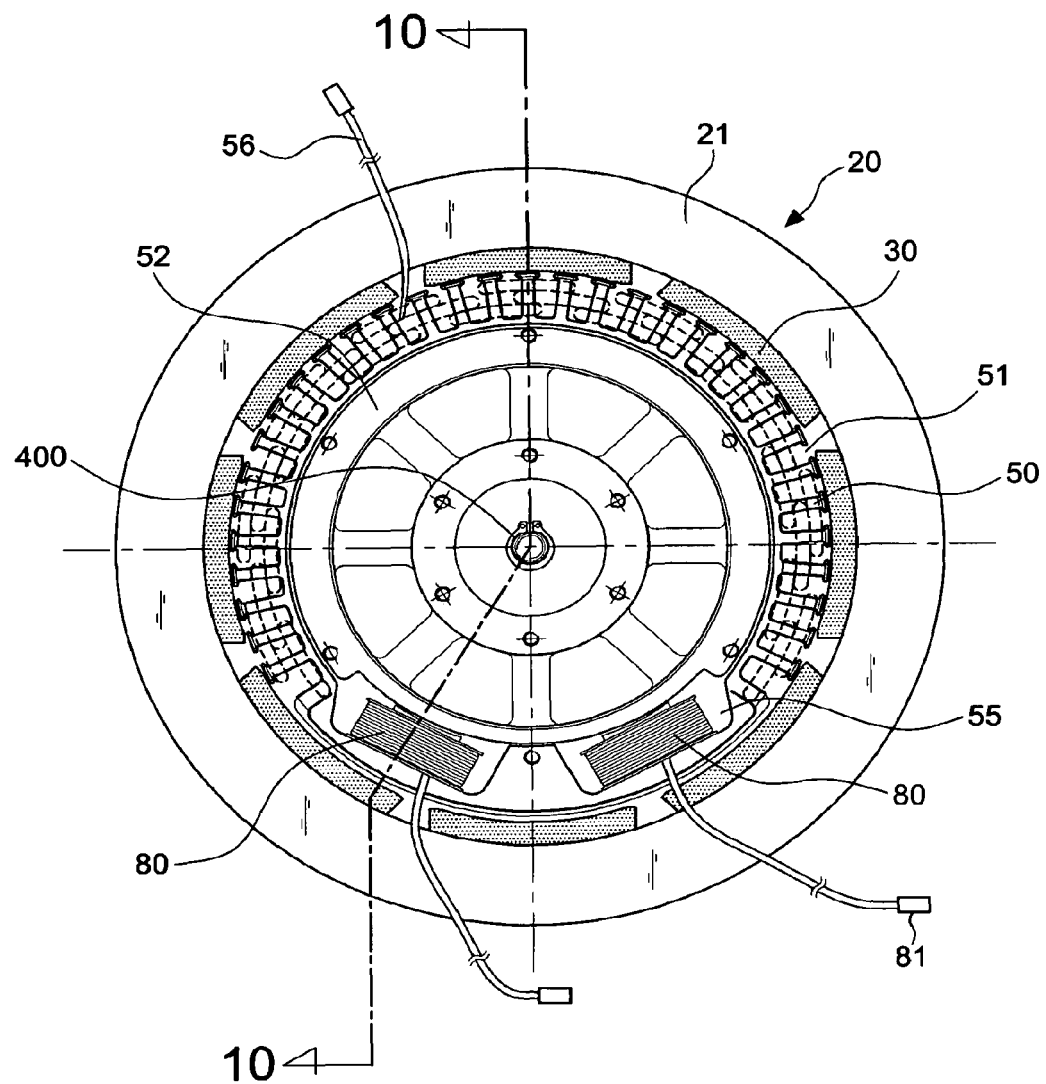
FIG. 9 is a front view of the second embodiment of the invention.

The invention is installed within a fitness apparatus or a rehabilitation apparatus. When pedals are operated by feet of the operator, a transmission element such as the belt or the chain (not shown) of the apparatus is driven to impart a rotation motion to the flywheel 20 via the driven wheel 44 such as a belt wheel or a chain wheel installed on the flywheel 20 of the generator. In this way, the permanent magnets 30 attached to the internal circumference of the flywheel 20 will rotate with the flywheel 20, thereby forming a rotor type. As a result, the magnetic field is changed such that the current-generating coils 51 fixed on the stator iron core 50 produces an electromotive force. Thus, an electric current is created. As shown in FIG. 5, the electric current produced by the current-generating coils 51 is transmitted via a current output line 56 to a power processing unit 57. One part of the electric current is supplied to a control panel 58 of the apparatus while the other part thereof is delivered via an input line 81 to the solenoids 80. In other words, the electric current is inputted to the solenoids 80 such that a reverse magnetic field is induced to form a closed magnetic loop with the magnet-conductive ring 31. However, the closed magnetic loop will be destroyed by the rotated flywheel 20. According to Lenz's law, an eddy-current magnetic resistance having the same intensity in opposite direction is produced for resisting when a stable magnetic field is destroyed by the external force. Therefore, the eddy-current magnetic resistance is employed to produce the exercise resistance or the braking resistance acting on the fitness apparatus or the rehabilitation apparatus. The intensity of the reverse resistance can be regulated by the intensity of current applying to the solenoid 80. The regulation can take place through the power processing unit 57 and the control panel 58. This is not the object of the invention so that no further descriptions thereto are given hereinafter.

The above-mentioned magnet-conductive ring 31 is additionally disposed on the internal ring 25, but the arrangement should not be restricted thereto. Alternatively, the magnet-conductive ring 31 can be directly formed on the internal ring 25. Also, the magnet-conductivity of the internal ring 25 can be utilized to produce a closed magnetic loop with the solenoids 80.

Moreover, one or more than one receiving portion 55 is provided. According to the embodiment, there are two receiving portions 55 for receiving the solenoids 80. This is a preferred embodiment. However, the arrangement should not be restricted thereto.

In this embodiment, the shaft for supporting the flywheel 20 is formed in the type of the rotational shaft 40. The driven wheel 44 is coupled with the rotational shaft 40 while the rotational shaft 40 imparts the unidirectional rotational motion to the flywheel 20. Therefore, both sides of the rotational shaft 40 according to the embodiment rotate on the support bracket 70 by use of the internal and external bearings 61, 54.

FIGS. 7 through 10 show a second embodiment of the invention. The elements identical with the first embodiment have the same reference sign. The features of the built-in eddy-current magnetic resistance are the same to that of the first embodiment. The difference lies only in that the shaft for supporting the flywheel 20 is a fixed shaft 400 rather than the rotational shaft 40. The fixed shaft 400 according to this embodiment passes through the wheel hub 23 of the flywheel 20 in such a way that both ends thereof protrude from the wheel hub 23 to form a fixing portion 405. According to this embodiment, the fixing portion 405 is a threaded body for screwing it on a certain position of the apparatus. A sleeve 401 is interposed between the fixed shaft 400 and the wheel hub 23. Meanwhile, a unidirectional bearing 402 and two ball bearings 403 are interposed between the sleeve 401 and the wheel hub 23. The internal end of the sleeve 401 is extended from the wheel hub 23 for the attachment to a driven wheel 404, thereby imparting a rotational motion to the sleeve 401 and the flywheel 20. In addition, a connection hole 521 is formed at the center of the iron core-fixing support 52 for the insertion of the fixed shaft 400.

An external bearing 54 is positioned between the fixed shaft 400 and an external coupling end of the wheel hub 23.

Figure 10:
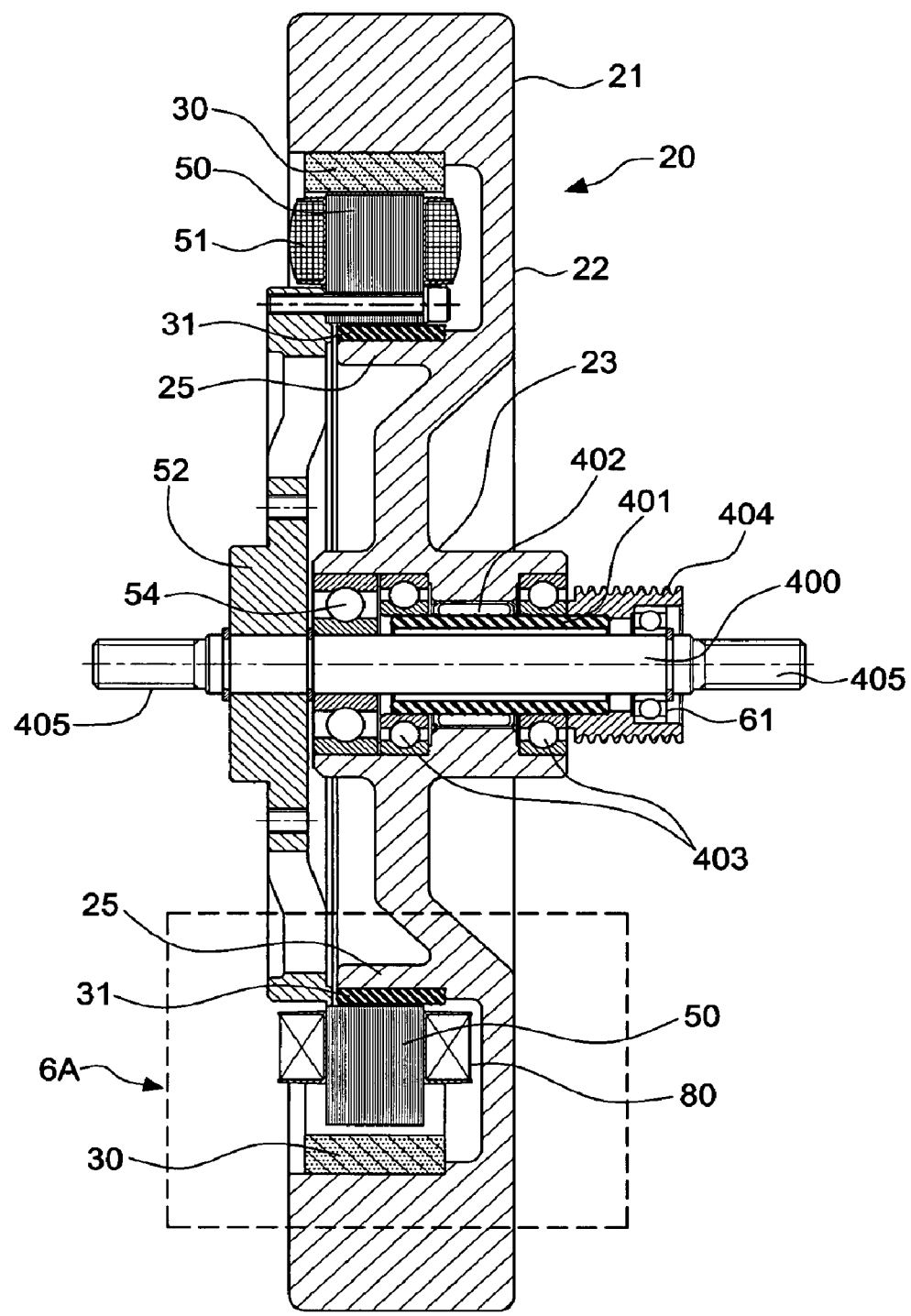
FIG. 10 is a cutaway view taken along line 10-10 of FIG. 9.

An internal bearing 61 is interposed between the fixed shaft 400 and the internal side of the shaft hole of the driven wheel 404. As shown in FIG. 10, the fixed shaft 400 and the iron core-fixing support 52 stay unmoved while the sleeve 401 imparts the unidirectional drive to the flywheel 20 when the flywheel 20 is moved. As a result, the second embodiment of the invention achieves the same built-in eddy-current magnetic resistance as the first embodiment.

In addition to having the advantages of U.S. Pat. No. 6,084,325, the combined generator with built-in eddy-current magnetic resistance in accordance with the invention further eliminates the drawbacks that the solenoids are positioned at the external circumference of the flywheel. In other words, the solenoids are internally disposed at the internal circumference of the stator iron core and produce a braking force acting on the internal ring 25 within the flywheel 20. As a result, the outer diameter of the flywheel 20 can be changed at will such that the intensity of the inertia of the flywheel 20 varies. In other words, the outer diameter of the flywheel 20 can vary according to the requirements of the products without affecting the braking force. This is one of the breakthroughs in the field of the fitness apparatus and the rehabilitation apparatus.

The design of the built-in eddy-current magnetic resistance of the invention ensures that the iron core of the current-generating coils 51 and the solenoids 80 are integrally formed as the stator iron core 50. Therefore, the demand on the material for the iron core is effectively reduced. Moreover, the volume of the generator can be minimized due to the built-in configuration of the solenoid 80, thereby facilitating the design or the assembly of the fitness apparatus. In this way, a higher utilization value of the invention is guaranteed.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A combined generator with built-in eddy-current magnetic resistance, comprising:

a) an outward turning type inertia flywheel having an external ring and an internal wall, a wheel hub being formed at the center of the internal wall, an opening end being positioned at the external side thereof;

b) a plurality of permanent magnets disposed at the internal side of the external ring, thereby forming a rotor;

c) a rotational shaft having a bearing unit mounting thereon for supporting the flywheel, one end thereof being provided with a driven wheel for imparting the rotational movement to the rotational shaft and the flywheel;

d) a stator iron core having current-generating coils on an external circumference thereof, an iron core-fixing support being attached to the external side thereof, an external bearing being disposed between a central hole of the iron core-fixing support and the rotational shaft;

e) a sleeve disposed at a side opposing to the iron core-fixing support, an internal bearing being interposed between the internal circumference of the sleeve and the rotational shaft; and f) a support bracket consisting of an internal support plate and an external support plate, an indentation being formed at the top of the support plates for receiving the sleeve and the iron core-fixing support in place, wherein a self-generated supply is achieved when the flywheel is driven to rotate around the stator iron core;

wherein an internal ring between the wheel hub and the external ring of the flywheel is extended from the internal wall toward the opening end; meanwhile, a magnet-conductive ring is mounted on the external circumference of the internal ring; and wherein the internal diameter of the stator iron core is greater than the external diameter of the magnet-conductive ring such that a magnetic field gap is created, and at least one double recessed type (⊔-shaped) receiving portion is formed in at least one portion of the internal circumference of the stator iron core for receiving one solenoid, and the power required by the solenoid is supplied by the self-generated system such that the solenoid produces a magnetic field that works with the coupled and rotated internal ring to create an eddy-current magnetic resistance so that a reverse resistance acts from the inside on the inertia flywheel.

2. The combined generator with built-in eddy-current magnetic resistance as recited in claim 1 wherein the bearing unit mounting on the rotational shaft includes a unidirectional bearing mounted on a middle section of the rotational shaft having a greater diameter and two ball bearings mounted on a section adjacent to both sides of the middle section.

3. The combined generator with built-in eddy-current magnetic resistance as recited in claim 1 wherein the receiving portion in the internal circumference of the stator iron core includes two double recessed (⊔-shaped) portions for receiving two solenoids.

4. The combined generator with built-in eddy-current magnetic resistance as recited in claim 1 wherein the magnet-conductive ring is directly formed on the internal ring.

5. A combined generator with built-in eddy-current magnetic resistance, comprising:

a) an outward turning type inertia flywheel having an external ring and an internal wall, a wheel hub being formed at the center of the internal wall, an opening end being positioned at the external side thereof;

b) a plurality of permanent magnets disposed at the internal side of the external ring, thereby forming a rotor;

c) a fixed shaft passing through the wheel hub of the flywheel in such a way that both ends thereof protrudes from the wheel hub to form a fixing portion, a sleeve being interposed between the fixed shaft and the wheel hub, a unidirectional bearing and two ball bearings being interposed between the sleeve and the wheel hub, the internal end of the sleeve being extended from the wheel hub for the attachment to a driven wheel, thereby imparting a rotational motion to the sleeve and the flywheel;

d) a stator iron core having current-generating coils on an external circumference thereof, an iron core-fixing support being attached to the external side thereof, a connection hole being formed at the center of the iron core-fixing support for the insertion of the fixed shaft;

e) an external bearing being positioned between the fixed shaft and an external coupling end of the wheel hub; and f) an internal bearing interposed between the fixed shaft and the internal side of the shaft hole of the driven wheel, wherein a self-generated supply is achieved when the flywheel is driven to rotate around the stator iron core;

wherein an internal ring between the wheel hub and the external ring of the flywheel is extended from the internal wall toward the opening end; meanwhile, a magnet-conductive ring is mounted on the external circumference of the internal ring; and wherein the internal diameter of the stator iron core is greater than the external diameter of the magnet-conductive ring such that a magnetic field gap is created, and at least one double recessed type (⊔-shaped) receiving portion is formed in at least one portion of the internal circumference of the stator iron core for receiving one solenoid, and the power required by the solenoid is supplied by the self-generated system such that the solenoid produces a magnetic field that works with the coupled and rotated internal ring to create an eddy-current magnetic resistance so that a reverse resistance acts from the inside on the inertia flywheel.

6. The combined generator with built-in eddy-current magnetic resistance as recited in claim 5 wherein the receiving portion in the internal circumference of the stator iron core includes two double recessed (⊔-shaped) portions for receiving two solenoids.

7. The combined generator with built-in eddy-current magnetic resistance as recited in claim 5 wherein the magnet-conductive ring is directly formed on the internal ring.

* * * * *